Jan. 23, 1945.  A. J WILLIAMS, JR  2,367,746
ELECTRICAL MEASURING SYSTEM
Filed Sept. 10, 1942  6 Sheets-Sheet 1
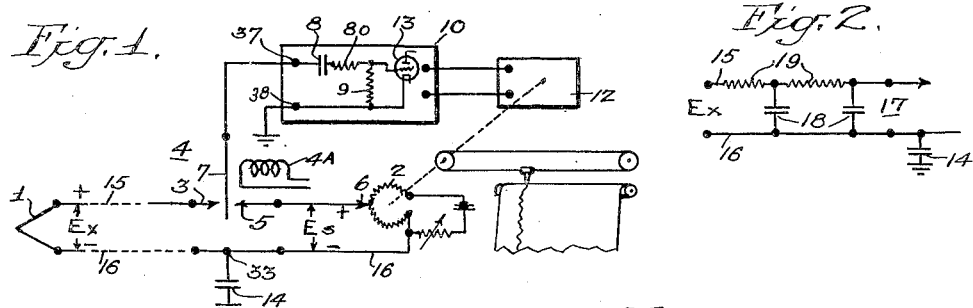
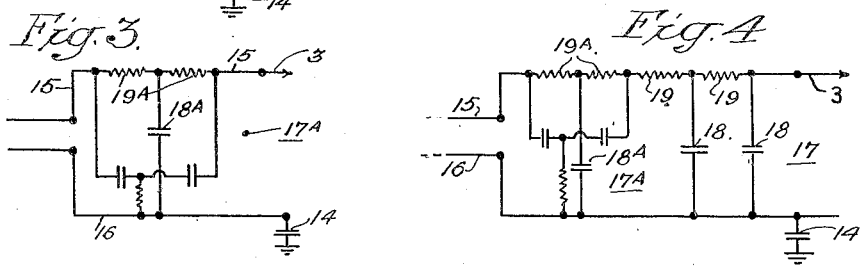
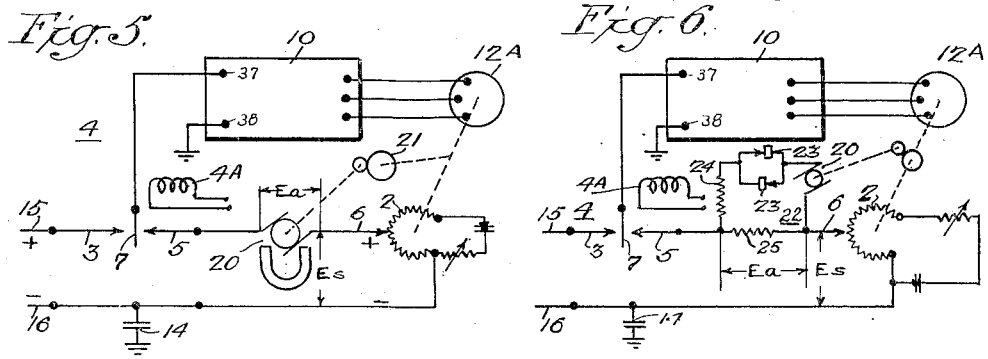
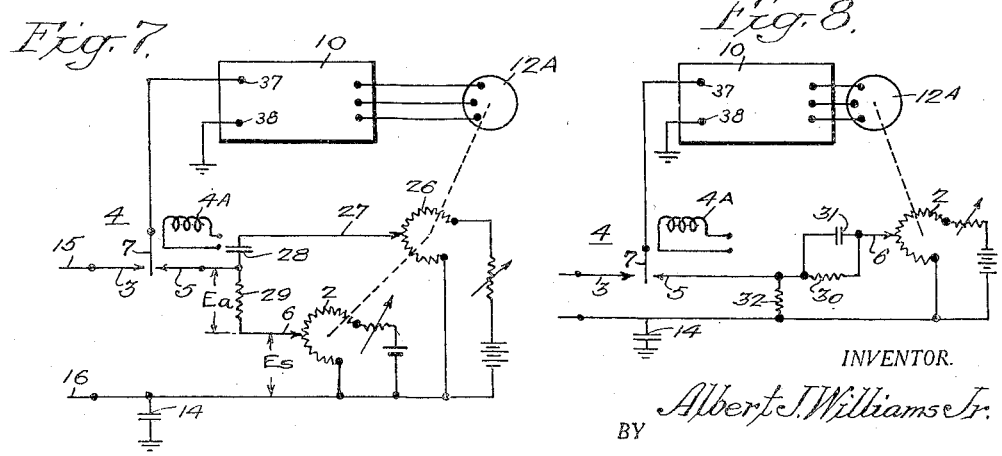
INVENTOR.
Albert J. Williams Jr.
BY
Cornelius D. Ehret
ATTORNEY.

Jan. 23, 1945.   A. J. WILLIAMS, JR   2,367,746
ELECTRICAL MEASURING SYSTEM
Filed Sept. 10, 1942   6 Sheets-Sheet 2

INVENTOR.
Albert J. Williams Jr.
BY
Cornelius D. Ehret
ATTORNEY.

Fig. 11

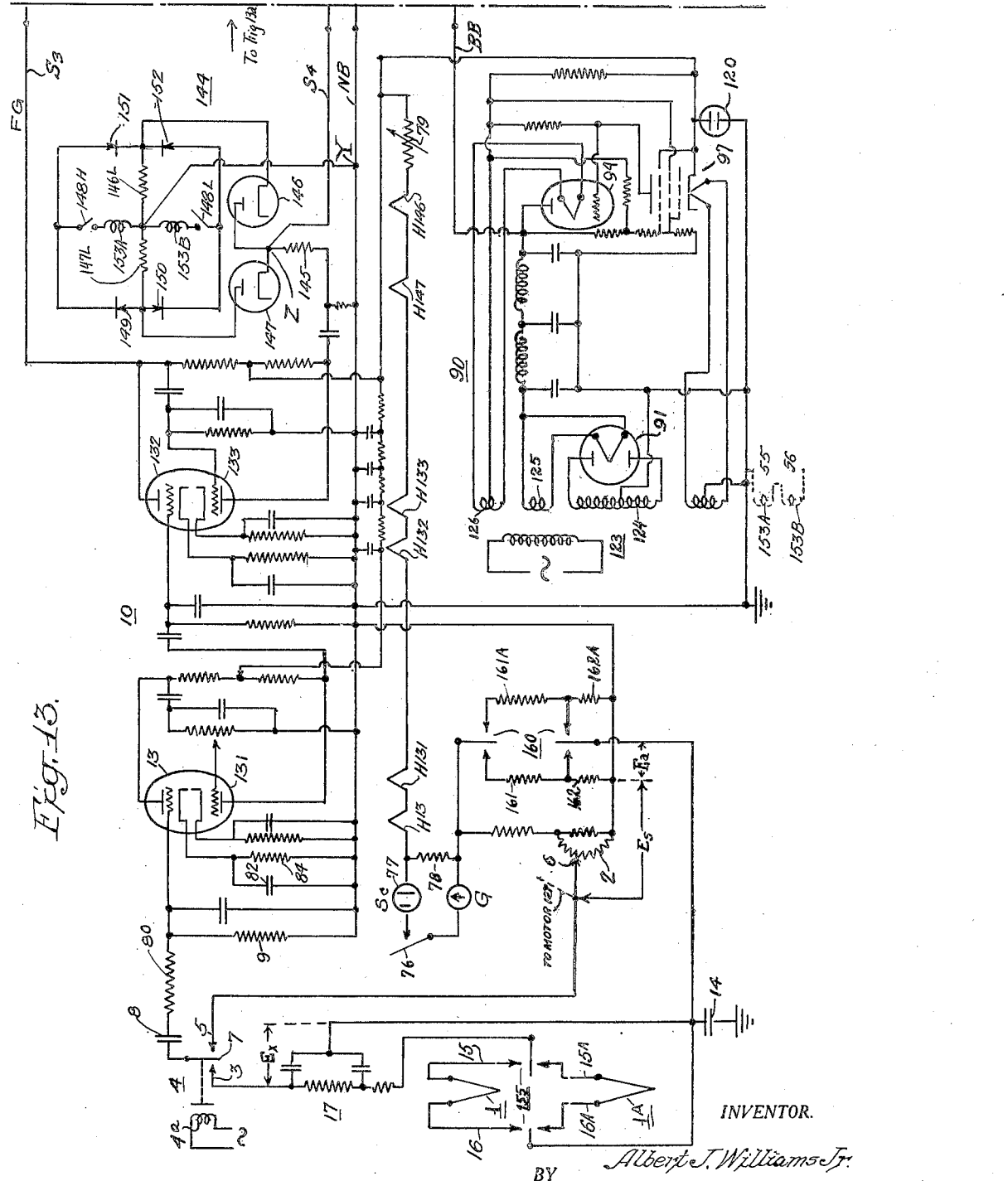

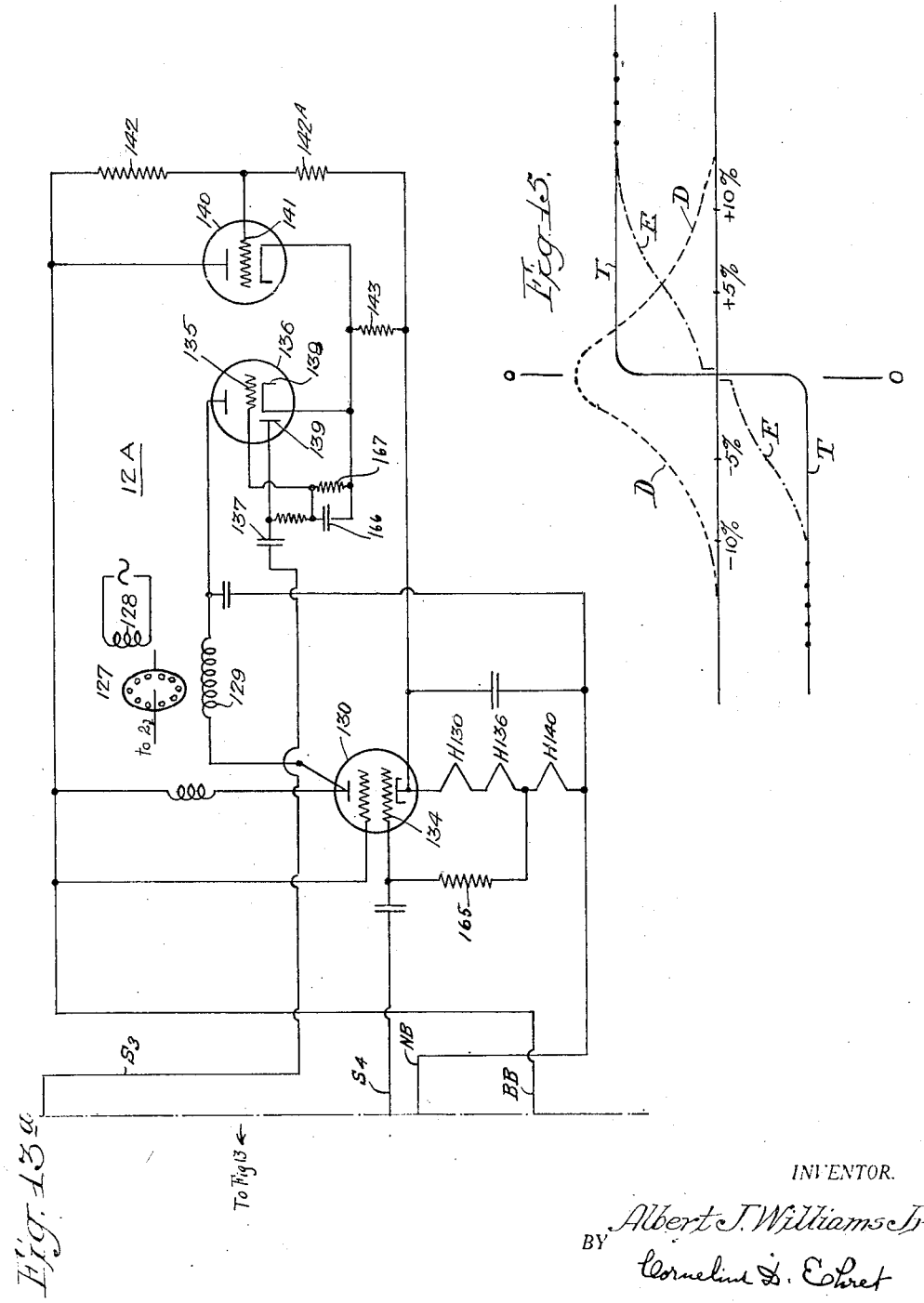

Jan. 23, 1945.  A. J. WILLIAMS, JR  2,367,746
ELECTRICAL MEASURING SYSTEM
Filed Sept. 10, 1942  6 Sheets-Sheet 6

INVENTOR.
Albert J. Williams Jr.
BY Cornelius D. Ehret
ATTORNEY.

Patented Jan. 23, 1945

2,367,746

UNITED STATES PATENT OFFICE 2,367,746

ELECTRICAL MEASURING SYSTEM

Albert J. Williams, Jr., Philadelphia, Pa., assignor to Leeds and Northrup Company, Philadelphia, Pa., a corporation of Pennsylvania Application September 10, 1942, Serial No. 457,845

6 Claims. (Cl. 171—95)

My invention relates to electrical measuring systems and particularly to systems for recording, or effecting a control in response to, the changes in magnitude of one or more unidirectional voltages varying as a function of temperature, ion-concentration, or other physical, chemical or electrical condition.

In accordance with one aspect of my invention, upon the input circuit of an alternating-current amplifier system is alternately impressed an unknown unidirectional voltage and a second known unidirectional voltage, for example that of a potentiometer slidewire, thus to produce an alternating signal voltage whose phase determines the sense of adjustment of the slidewire or equivalent by a motor or electro-mechanical relay system; more particularly, the slidewire is traversed by current from a well regulated power-pack used also to supply current to networks each corresponding with a source of unknown voltage to be measured and from each of which is derived a voltage compensatory of the effect upon the unknown voltage of a condition other than the condition whose magnitude is desired to be determined by measurement of the unknown voltage.

Further in accordance with my invention, the braking of a motor utilized to effect adjustment of said slidewire, or equivalent, is controlled by a thermionic tube supplied with motor-braking current from said regulated source and whose disturbing effect upon the constancy of the output voltage of said source is compensated by a second tube whose current drain upon said source varies complementarily to that of said first-named tube.

Further in accordance with my invention, a rectifier network included in the amplifier system is selectively controlled by limit switches to discriminate between signal voltages of different phase relation with respect to an alternating voltage impressed on the rectifier network so that when the potentiometer slidewire, or equivalent is adjusted to either limit of its range of adjustment that portion of the amplifier system beyond the network is desensitized with respect to any signal of phase corresponding with or demanding further adjustment of the slidewire in the same direction.

My invention further resides in the features of combination and arrangement hereinafter described and claimed.

For an understanding of my invention, reference is made to the accompanying drawings in which:

Fig. 1 diagrammatically illustrates a temperature-recording system;

Figs. 2 to 4 illustrate filter networks for inclusion in the system of Fig. 1;

Figs. 5 to 9 illustrate several rebalancing arrangements suited for inclusion in the system of Fig. 1;

Figure 10:
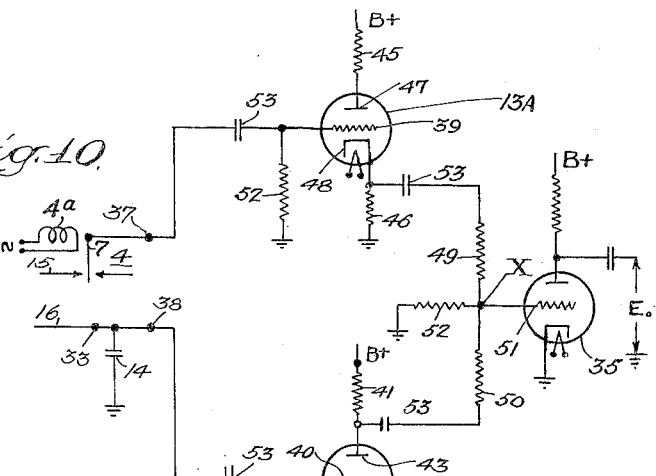
Figure 10A:
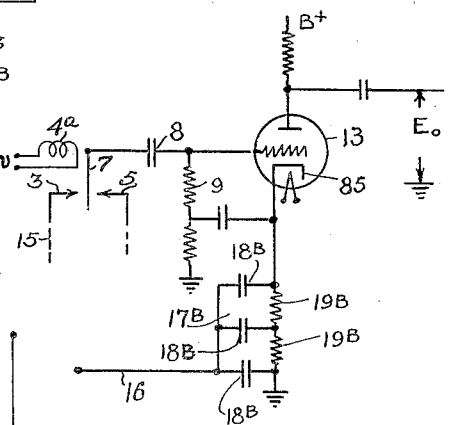
Figure 16:
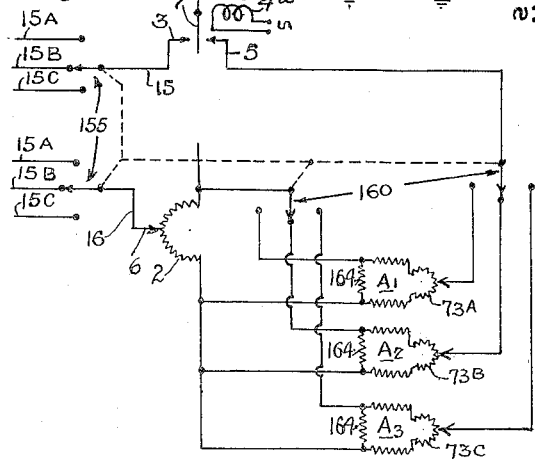
Figure 12:
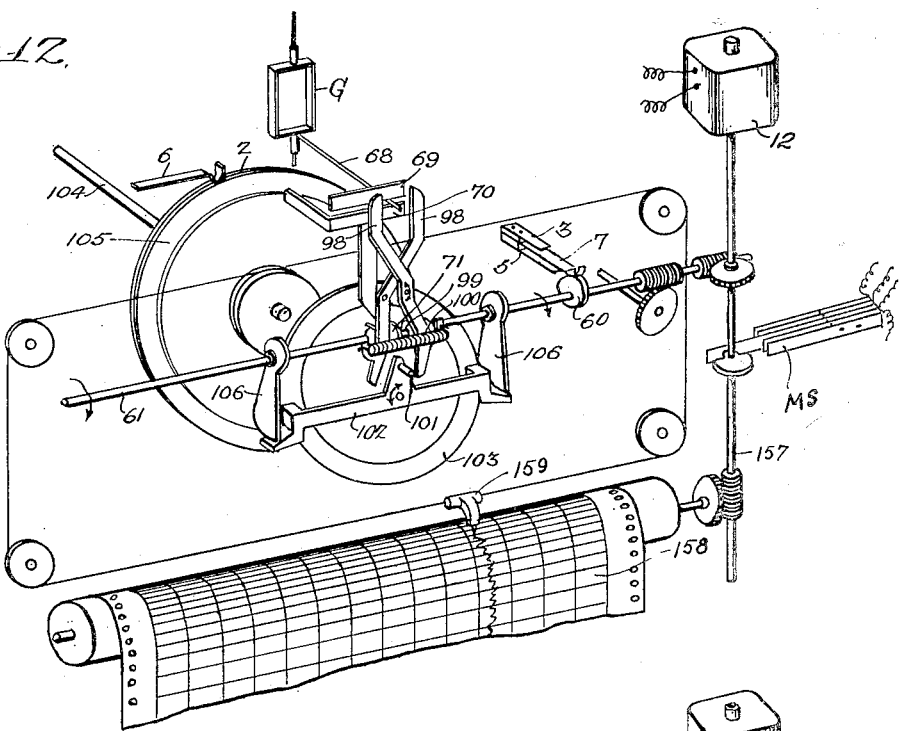
Figure 14:
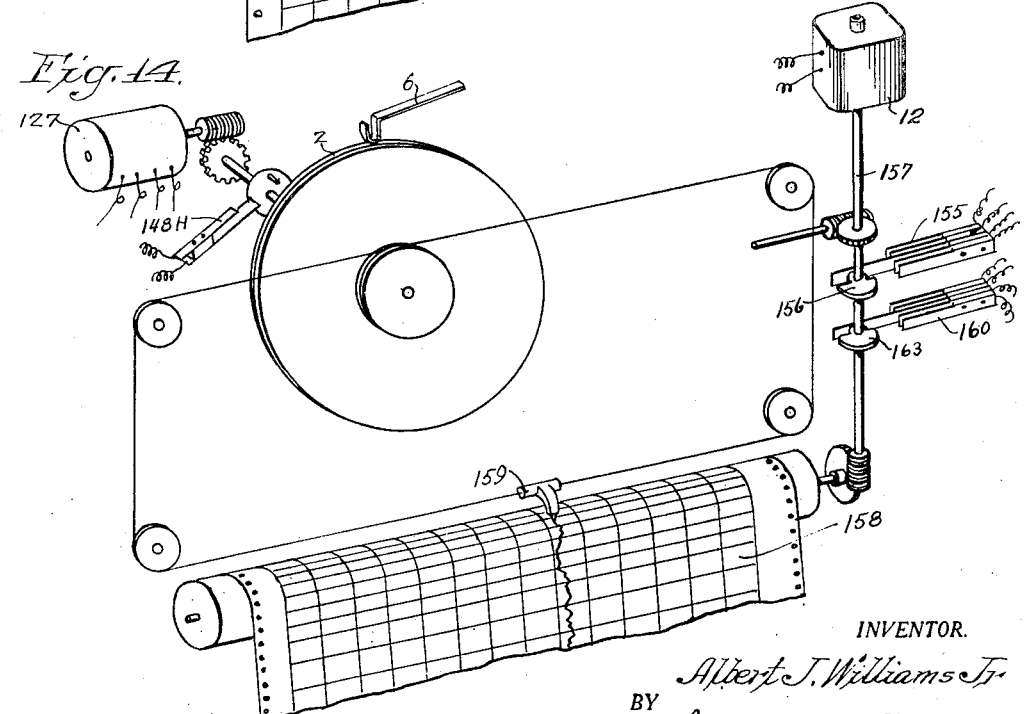

Figs. 10 and 10A diagrammatically illustrate modifications of the amplifier system comprised in Fig. 1;

Figure 11:
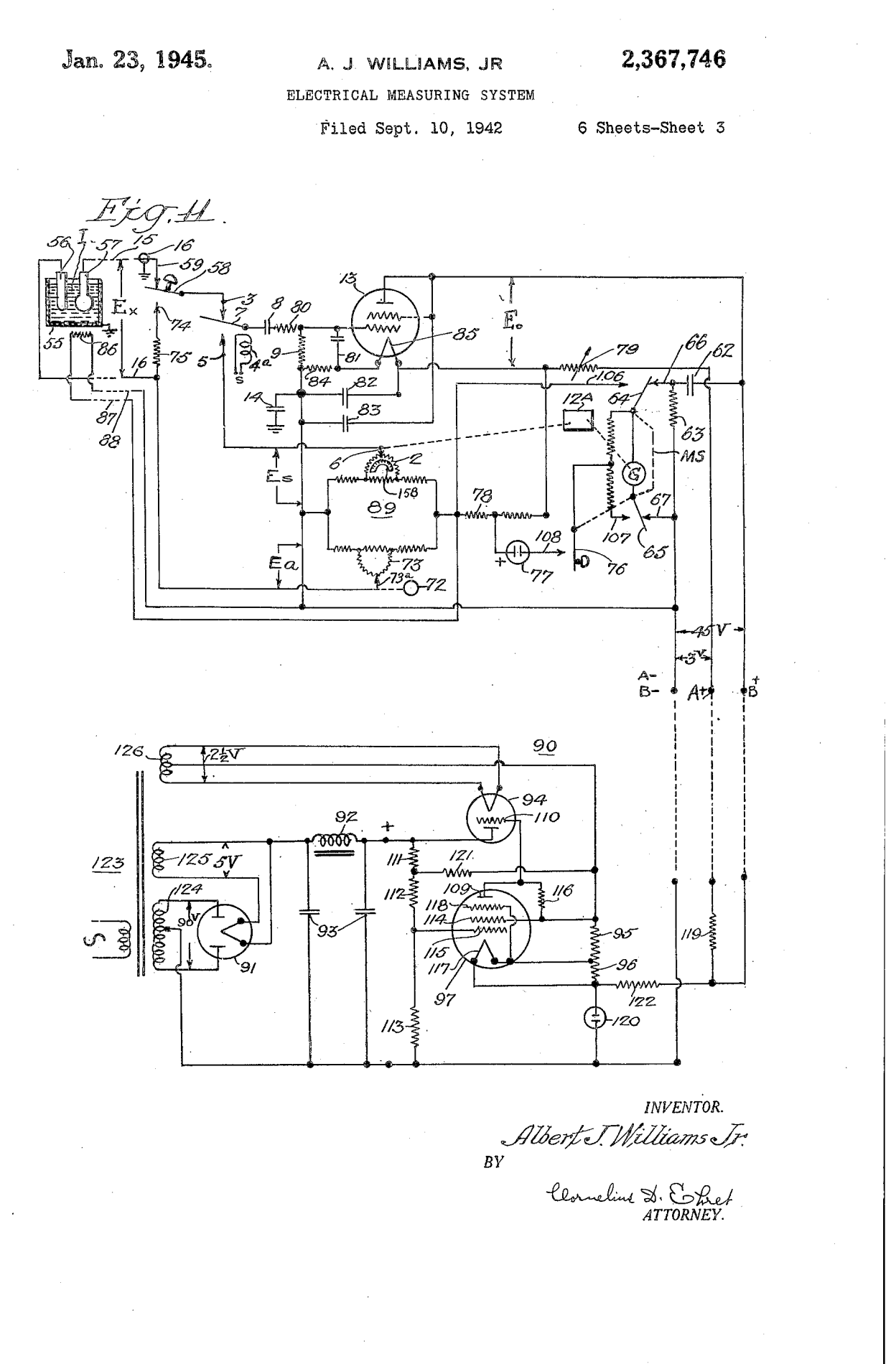

Fig. 11 is a wiring diagram of a system for measuring ion-concentration;

Fig. 12, in perspective, shows the principal components of recorder mechanism suited for use with the system of Figs. 1 and 11;

Figs. 13 and 13A comprise a wiring diagram of a system for effecting rapid measurement of one or more unknown voltages;

Fig. 14, in perspective, shows significant elements of recorder mechanism suited for the system of Figs. 1 and 13;

Fig. 15 comprises explanatory curves mentioned in description of the operation of Fig. 14;

Fig. 16 illustrates a modification of a portion of the system of Fig. 11.

Referring to Fig. 1, one terminal of the source of unknown voltage $E_x$, for example thermocouple 1, is connected to one terminal of a source of standard voltage $E_s$, for example potentiometer slidewire 2. The other terminal of source $E_x$ is connected to one of the fixed contacts 3 of vibrator 4 whose other fixed contact 5 is connected to the other terminal of the source of standard voltage $E_s$, or more particularly to the adjustable contact 6 of slidewire 2. The movable contact 7 of the vibrator 4 is connected to condenser 8 included in series with resistance 9 in the input circuit of the amplifier system indicated by rectangle 10. The alternating signal voltage produced, as hereinafter described, across resistor 9 is applied to the input electrodes of the first tube 13 of the amplifier.

In the output system of amplifier 10 is included a rebalancing device 12 suited to effect relative adjustment of slidewire 2 and the contact 6; the rebalancing device 12 may comprise, as disclosed in Wunsch Patent 2,285,842, a balistic galvanometer and a mechanical relay system, or, as disclosed in my Patent 2,113,164, it may include a reversible motor and tubes controlling the energization thereof in accordance with the output of amplifier 10.

The coil 4A of vibrator 4 may be energized from any suitable source of current; for example, when the operating voltages for the tubes of amplifier 10 are derived from a source of alternating current, coil 4A may be energized from the same source. When the vibrator coil is to be energized from direct current, its circuit may be intermittently broken, as by another set of fixed and movable contacts.

As the movable contact 7 of vibrator 4 alternately engages the fixed contacts 3 and 5, the condenser 8 is alternately subjected to the unidirectional voltages $Ex$ and $Es$; assuming these voltages become equal, the potential of the vibrating contact 7 quickly assumes the same potential as the fixed contacts and no alternating potential signal is impressed upon the grid of the amplifier tube 13.

If for example the unknown voltage $Ex$ increases, the potential of contact 7 increases upon engagement with fixed contact 3 and decreases upon engagement with contact 5. Accordingly there is impressed upon the grid of tube 13 an alternating potential whose magnitude is a function of a difference between the two unidirectional voltages $Ex$ and $Es$.

In response to this unbalance of the voltages $Es$ and $Ex$, the rebalancing device 12 is energized by or in accordance with the output of amplifier 10 to effect adjustment of slidewire 2 in a sense to increase the standard voltage $Es$ until the vibrator contacts 3 and 5 are again at the same potential.

If the unknown voltage $Ex$ decreases from the magnitude for which it previously was balanced by $Es$, the potential of the vibrator contact 7 increases each time it engages contact 5 and decreases upon each engagement with contact 3. Accordingly there is impressed upon the grid of amplifier tube 13 an alternating voltage whose magnitude is dependent upon the difference of voltages $Ex$ and $Es$ and which is 180° out of phase with respect to the alternating voltage produced when $Ex$ is greater then $Es$.

In general, the frequency of the signal voltage is determined by the frequency of the operation of the switch comprising contacts 3, 5, 7; the amplitude of the signal voltage depends upon the existing difference between the magnitudes of voltages $Es$ and $Ex$; and the phase of the signal voltage with respect to the movement of contact 7 depends upon which of voltages $Es$, $Ex$ is the greater.

As appears in the aforesaid Wunsch and Williams patents, the rebalancing device 12 is capable of discriminating between the aforesaid two possible phase relations of the signal voltage to effect adjustment of slidewire 2 in direction proper to restore balance between the voltages $Ex$ and $Es$: as hereinafter more clearly appears, (a) when the rebalancing device 12 is of the mechanical relay type, Fig. 12, the phase discrimination exists because the cams 60 and 70 which control movement of contact 7 and clamping of galvanometer pointer 68 rotate in synchronism and are so phased that the pointer is free to deflect for movement of contact 7 into engagement with only one of contacts 3 and 5 and therefore can deflect in only one direction from neutral so long as $Ex$ is greater than $Es$ and can deflect only in opposite direction from neutral so long as $Es$ is greater than $Ex$; and (b) when the rebalancing device is of the reversible motor type, one winding of the motor may be energized by current having fixed phase relation with respect to movement of contact 7 and another winding of the motor may be energized by output current of the amplifier, as in Figs. 1 and 3 of my aforesaid patent and in Fig. 13a hereof, whose phase with respect to movement of contact 7 depends upon which of voltages $Es$ and $Ex$ is the greater; or alternatively, as shown in Fig. 4 of my aforesaid patent, the motor may be of the split-field universal type having its field windings disposed in the anode circuits of thyratons supplied from a source of current having the same frequency as the signal voltage and upon whose grids is impressed the amplified signal voltage.

Condenser 14 stabilizes the potential of thermocouple 1 and slidewire 2 with respect to ground; it completes the alternating current circuit from the amplifier 10 to the thermocouple 1 and slidewire 2 but prevents passage of direct current so that in event the thermocouple circuit is intentionally or accidentally connected to a source of direct-current potential no harm or improper operation will result.

The disturbing effects of stray alternating current fields can be avoided insofar as the amplifier 10 is concerned by recourse to the usual expedients including shielding but it is difficult, even though shielding is used, to avoid pick-up by the thermocouple leads 15, 16, which may extend in many cases to considerable distance, for example several hundred feet, from the vibrator 4. To reduce or eliminate the effect of disturbing voltages picked up by the thermocouple circuit, they may be attenuated by filters such as shown for example in Figs. 2 to 4.

Referring to Fig. 2, the filter 17, which may be inserted in the thermocouple leads 15, 16 (the latter may be a sheath enclosing the former), is of the "low-pass" type comprising the shunting condensers 18 and the series resistances 19. Preferably and as shown, there is no step-up transformer between the vibrator 4 and the amplifier 10. To be effective such input transformer would necessarily present a low impedance to the thermocouple circuit but under this circumstance the filter 17 to be effective would necessarily be a low impedance filter and condensers 18, to be of reasonable cost and size, would have to be of the electrolytic type. However, use of electrolytic condensers is objectionable in my system because of their leakage current. Without the input transformer, the filter 17 can be and is of the high impedance type using reasonably small inexpensive condensers 18 of paper or mica types.

The filter 17A shown in Fig. 3 is of the so-called "twin T" type with constants so chosen that it attenuates, to zero, alternating current of the frequency corresponding with the period of the vibrator 4, which may for example be 1/60 second.

As shown in Fig. 4, the filters 17 and 17A of Figs. 2 and 3 may both be utilized electrically in series between the thermocouple and the vibrator 4 and adjacent the latter.

When necessary or desirable, filters may be utilized beyond vibrator 4, as in the amplifier itself; such filters must of course pass alternating current of frequency corresponding with the vibrator frequency but they need not pass direct current except of course when in location requiring passage of direct current to a tube or tubes. Because filters beyond the vibrator are in effect common to both the thermocouple and slidewire circuits, direct current leakage in them is not a source of error of measurement, because the signal is an alternating current signal, although leakage may affect sensitivity. These filters should be designed to have minimum delay and minimum phase shift variation with frequency.

Particularly when the rebalancing device 12 is of a type capable of effecting rapid rebalancing adjustment of slidewire 2, for example a relatively powerful motor, the damping of the system may be insufficient to prevent overshooting of the balance point particularly when there has occurred a large and rapid change in magnitude of voltage E*x*. To avoid or minimize overshooting, there may be included effectively in series with one or the other of the voltages E*x*, E*s*, preferably the latter, and the associated vibrator contact 3 or 5 a voltage modifying device which serves to modify the voltage difference at 3 and 5. Figs. 5–9.

More particularly, generator 20, Fig. 5, driven from motor 12A through suitable coupling or gearing 21, is connected between the slidewire contact 6 and vibrator contact 5. The generator 20 is so poled that during rebalancing adjustment of slidewire 2 the potential of contact 5 becomes equal to that of contact 3 before voltage E*s* is readjusted to equality with E*x*; consequently the motor 12A is de-energized before the slidewire arrives at the true balance point. As the motor coasts or decelerates after its de-energization, the magnitude of voltage E*a* approaches zero. If during this coasting period, the algebraic sum of the voltages E*s* and E*a* remain constant and equal to E*x* slidewire 2 comes to rest at the true balance point without further energization of motor 12A. If, as is more usual, the motor de-accelerates at a higher or lower rate the algebraic sum of voltages E*a* and E*s* becomes higher or lower than the voltage E*x* and the motor 12A receives short current impulses tending either to accelerate or decelerate it and so tend to effect equality between E*x* and the algebraic sum of E*a* and E*s*.

In the modification shown in Fig. 6, the network 22 associated with generator 20 includes the reversely poled rectifiers 23, of the metal/metal oxide type for example, to afford a response which is at least roughly proportional to the second power or square of the speed of rebalancing and therefore roughly proportional to the kinetic energy of the moving parts. The flow of the generator current through resistance 25, common to the network 22 and the slidewire circuit, produces the voltage E*a*. The magnitude of the current depends upon the generator voltage and also upon the resistance of the rectifiers which varies as a function of that voltage. The total resistance of resistors 24 and 25 is chosen to afford the desired variations of total resistance of the network 22 for different generator speeds and the ratio of the resistances 24 and 25 is selected to inject a desired percentage of voltage drop across them into the slidewire circuit.

The modification shown in Fig. 7 affords a response characteristic similar to the system of Fig. 5 but without recourse to generator 20 or equivalent. In substitution for generator 20 is included a network comprising the auxiliary potentiometer slidewire 26 (adjustable concurrently with slidewire 2 but of greater voltage range), the condenser 28 and the coupling resistance 29. The displacement current which flows through condenser 28 is essentially proportional to the speed of adjustment of slidewire 26; this current flowing through resistance 29 produces, during the rebalancing adjustment, a voltage drop E*a* between the slidewire contact 6 and vibrator contact 5. As in the modification of Fig. 5, the voltage E*a*, of polarity dependent upon direction of adjustment of slidewire 2 and of magnitude dependent upon the speed of that adjustment, permits rapid rebalancing of voltages E*s* and E*x* with avoidance of overshooting or hunting of the true balance point at which E*a* is zero.

The modification shown in Fig. 8 affords a response characteristic similar to that of 5 and 7 but without need to use the generator 20 of Fig. 5 or the additional slidewire 26 of Fig. 7; in other words, in the rebalancing arrangement of Fig. 8 there are no more moving parts than in the system of Fig. 1 yet there is obtained the anticipatory control features of Figs. 5 and 7. For proper operation, the resistance 30 in shunt to condenser 31 should not be less than resistance 32 and should be greater than the resistance of slidewire 2. The slidewire 2 must be calibrated and the ratio of its voltage range to the range of measurement should not be less than $$\frac{R1+R}{R}$$

wherein

R1 = resistance of 30;
R = resistance of 32.

Figure 9:
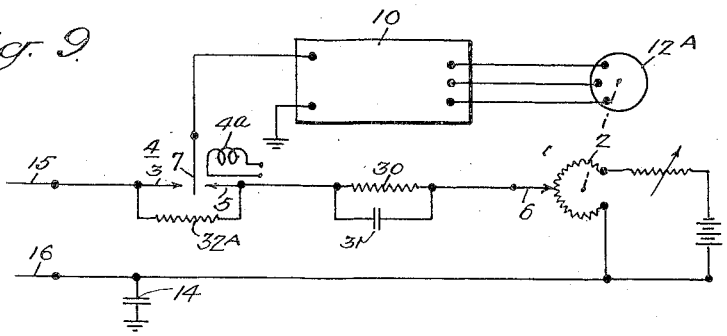

For larger and larger ratios of R to R1, the system shown in Fig. 8 approaches in electrical equivalency the modification shown in Fig. 9. In this modification, Fig. 9, the signal voltage to the amplifier depends upon an additional function, the rate of change with time of the thermocouple voltage. This is of advantage when it is desired the adjustment of the slidewire 2, and therefore of any recorder pen or indicator coupled thereto, shall closely or exactly follow the voltage changes without a "following" or "velocity" error. Only if the voltage E*x* ceases rising or falling abruptly, as at the end of the range of adjustment of a transmitter slidewire, can overshooting occur.

Any of the balance-anticipating arrangements shown in Figs. 7 to 9 may replace the simpler rebalancing arrangement of Fig. 1, and in any of these modifications including Fig. 1, as shown, may be utilized any of the filter arrangements shown in Figs. 2 to 4.

As previously herein stated, connection from any point on the thermocouple circuit to ground or to a source of direct potential does not adversely affect the operation of the system. If however a point on the thermocouple circuit is connected to a source of alternating current grounded directly or through impedance, trouble may or may not arise in dependence upon factors now discussed. If the connection is to lead 16 and if the alternating current source is of the constant current or high impedance type, a condenser 14 of high capacitance may itself be sufficient to avoid trouble because it provides a low impedance return path to that source. Under the same circumstances, except for a connection of the source of disturbing alternating current to lead 15, in addition to use of a large condenser 14, a filter, for example such as shown in Figs. 2 to 4, must be used.

If the alternating current source is of the constant voltage or low impedance type, it may not be possible or practical to use a condenser 14 of capacitance large enough to avoid trouble. Filters of the type having series impedance in both of the leads 15 and 16 could be employed, but this introduces further complications.

Preferred solutions, Figs. 10 and 10A, involve use of an amplifier which is insensitive to any difference of alternating current potential between ground and its input terminals.

Referring to Fig. 10 which discloses the receiving or input end of an amplifier of this type, the alternating current signal produced by the vibrator 4 is impressed upon the input terminals 37, 38 of the amplifier to effect out-of-phase variations of the potentials of the grids or control electrodes 39, 40 of the tubes 13A, 13B, the latter serving as a phase inverter tube. Resistances 41 and 42, equal in magnitude, have one terminal connected to anode 43 and cathode 44 respectively of tube 13B, and each has its other terminal at ground potential insofar as alternating currents are concerned. The resistances 45 and 46 are in like manner connected between ground and the anode 47 and cathode 48 of the tube 13A. The resistance 46 in the cathode to ground circuit of tube 13A and resistance 41 in the anode to ground circuit of tube 13B are included in a voltage dividing circuit including the resistances 49, 50 of substantially equal and high order of magnitude. The grid 51 of amplifier tube 35 is connected, as by connection to the common terminal of resistances 49 and 50, to a potential point X intermediate the cathode 48 of tube 13A and the anode 43 of tube 13B.

Consequently, when there exists a disturbing alternating current difference of potential between ground and the input terminals 37, 38 of the amplifier, the potentials of the grids 39 and 40 vary in like phase and the potentials of cathode 48 and anode 43 vary in opposite phase because of the inversion and consequently there is no variation, arising from the disturbing source, of the potential of point X or of the grid 51 of tube 35. As previously stated however, the alternating signal due to unbalance of the thermocouple and slide-wire voltages effect out-of-phase variation of the potentials of the grids 39 and 40 of the tubes 13A and 13B, and consequently the alternating signal voltage is transmitted by tubes 13A, 13B to the input circuit of the tube 35.

The tubes 13A, 13B and 35 are provided with appropriate grid leak resistances 52 and blocking condensers 53. In the input system of the amplifier shown in Fig. 10, may be included any suitable filter system such as shown in Figs. 2 to 4. The B+ terminals of the resistances 41 and 45 may be effectively grounded by using an anode current supply source of low impedance.

In the modification shown in Fig. 10A, the multi-section filter 17B comprising condensers 18B, each of large capacitance, for example 300 microfarads, and resistors 19B each of fairly large resistance, for example 5000 ohms, attenuates by a very large factor, about a million, the disturbing effect upon the difference of potential, of signal frequency, between the cathode and grid of tube 13 of any alternating difference of potential between earth and the leads or components of the thermocouple and voltage-standard circuits connected to each other and to the contacts 3 and 5.

As exemplary of a system embodying the invention and utilizing a rebalancing arrangement generally similar to the aforesaid Wunsch patent, reference is made to Figs. 11 and 12. Though not limited to such use, the system is shown as used to record the variations in ion-concentration of a solution I within the processing tank, sampling cup, or flow channel 55. The reference electrode 56 and the measuring electrode 57, together with the solution I, produce voltage $Ex$ of magnitude varying as a function of the concentration of a selected ion; the measuring electrode 57 may for example be of the "glass" type and the reference electrode 56 of the "calomel" type. Tube 13 may be of the 1D5GP type.

With movable contact 58 of the "check" switch in engagement with its fixed contact 59, the voltage $Ex$ of the ion-concentration cell is applied to the input circuit including resistance 9 and condensers 8 and 14. When contact 7 is moved away from engagement with contact 3 into engagement with contact 5, there is substituted for the unknown voltage $Ex$ of the cell the standard voltage $Es$, all as in the system of Fig. 1. In this modification, the movement of contact 7 may be effected by a cam 60, Fig. 12, mounted upon the continuously rotating shaft 61 of mechanical relay mechanism of the type described in Squibb Patent 1,935,732 or the switch operated by cam 60 may control the energization of coil 4A of Fig. 1. As the usual speed of shaft 61 is of the order of 30 revolutions per minute, the signal frequency applied to the grid of tube 13 when the voltages $Ex$, $Es$ are unbalanced is materially lower than in other figures, for example Fig. 13.

So long as the contacts 3 and 5 are at the same potential, there is no change in the anode current of tube 13 as contact 7 moves to and from engagement with contacts 3 and 5 and accordingly there is no flow of current to or from the condenser 62, Fig. 11, disposed in series with a resistance 63 in a path in shunt to the inter-electrode path between the anode and cathode of tube 13. Consequently so long as contacts 3 and 5 remain at the same potential, there is no deflection of the galvanometer G normally connected across resistance 63 by a multi-pole switch MS having movable contacts 64 and 65 then respectively in engagement with fixed contacts 66 and 67.

During movement of contact 7 into engagement with one or the other of contacts 3 and 5, the galvanometer pointer 68 is free to deflect in response to any signal related to difference of potential of contacts 3 and 5 and while so deflected is engaged and held by the clamping bars 69, 70 periodically operated by a cam 71 mounted upon shaft 61 driven by motor M, Fig. 12, through shaft 157. Assuming for example the relative angular positions of cams 60 and 71 are such that the pointer 68 is free to deflect when contact 7 is moved into engagement with contact 3, for example, the pointer is held against deflection by bars 69 and 70 for that portion of the cycle in which contact 7 is moved into engagement with the other contact, contact 5.

During the portion of each cycle of the relay mechanism for which the pointer 68 is held fast by the clamping bars, the feelers 98, 98 are released by a cam 99 on shaft 61 for movement toward each other by the spring 100. If the pointer is displaced from its central or neutral position, the lower end of one or the other of feelers 98, depending upon the sense of displacement of the pointer, engages the pin 101 extending from the driving clutch member 102 and rocks it through an angle determined by the extent of the pointer displacement. Subsequently in the cycle, clutch member 102 in its displaced position is permitted to move by a cam, not shown, into engagement with the driven clutch member 103 attached to shaft 104 upon which is mounted the supporting disc 105 of the slidewire 2. Subsequently in the cycle, one or the other of the restoring cams 106 engages the clutch member 102 and returns it to its original horizontal or neutral position and, because the clutch members 102, 103 are in engagement at this time, the slidewire 2 is adjusted relative to its contact 6 in a sense and to an extent determined by the sense and extent respectively of the galvanometer deflection.

When the voltages are not equal and opposite, the pointer 68 if free to deflect would move in one direction upon engagement of contact 7 with contact 3 and in reverse direction upon engagement of contact 7 with contact 5. To effect adjustment of slidewire 2 by cam 106 only and always in the proper direction to effect balance of the voltages, the cams 60 and 70 are so disposed, as aforesaid, that one of the deflections, that otherwise occurring upon engagement of contact 5 for example, is always suppressed. The system is thus able to distinguish between the phases of the signal voltages produced when the unknown voltage is higher and lower than the opposing voltage of slidewire 2.

In this modification, Fig. 11, the source of current from which is derived the standard voltage E$s$ is also utilized to heat the cathode 85 of tube 13 which in the particular system illustrated is of the directly-heated or filament type. From this same source is also derived a voltage E$a$ effectively in series with the unknown voltage E$x$ and compensatory of variations of asymmetry of the ion-concentration cell.

The magnitude of voltage E$a$ may be manually adjusted from time to time by knob 72 attached to the adjustable element of potentiometer 73 included in network 89 in shunt to the measuring slidewire 2. Movable contact 58 of the "check switch" may be moved into engagement with its contact 74 to substitute for the ion-concentration cell a resistance 75 of suitably high magnitude.

Also from time to time, the current through the slidewire 2 should be checked manually, or by suitable mechanism in the recorder itself such as shown in Fig. 13 of aforesaid Squibb patent to determine whether it has departed from the predetermined magnitude for which calibrated. To that end, the movable contacts 64, 65 and 76 of switch MS are moved to the left into engagement with contacts 106, 107 and 108 respectively to connect the galvanometer G effectively in series with calibrating resistance 78 and a standard cell 77 whose voltage is in opposition to that existing across the calibrating resistance 78. The rheostat 79 is adjusted to restore the slide current wire to standard value for which the galvanometer deflection is null.

The condenser 8 in the grid circuit of tube 13 prevents flow of any appreciable current from the glass electrode to the grid and so minimizes grid current error. The resistance 80 and the condensers 81, 82 and 83 serve as filter elements preventing undesired voltages from appreciably affecting operation of the system.

The resistance 84 in series with the filament 85 of the tube 13 provides the direct-current grid bias.

As distinguished from systems in which the grid of the tube is continuously connected to the glass electrode and intermittently connected to ground or cathode, this system affords increased sensitivity because the capacitance of the shielded lead extending to the glass electrode is not discharged by operation of the switch 7.

In automatic compensation for the effects of temperature upon the voltage produced by the ion-concentration cell, a resistance thermometer 86 may be disposed in intimate thermal relation to the ion-concentration cell and connected by leads 87, 88 across the network 89 in effect to recalibrate the slide wires 2 and 73 for each different temperature of solution I.

If there are found to be errors of measurement due to absorption effects of condenser, they may be avoided by interchanging, electrically, the positions of the voltages E$s$ and E$a$; that is, in Fig. 11, by connecting contact 5 to contact 73$a$ of slidewire 73 and lead 16 to contact 6 of slidewire 2.

It is here pointed out that voltage E$s$ does not usually correspond with the ion-concentration or pH; for example if the voltage E$x$ of cell 55 is zero at a magnitude of pH corresponding with the midpoint of scale 158, the potential of contact 2 with respect to the electrical midpoint of the slidewire corresponds with the pH or other reference point having the same potential. Similarly the asymmetry correction corresponds not with voltage E$a$ but with the difference of potential between contact 73$a$ and a point of the same potential as aforesaid reference point of potential.

With my system, the solution in the cell I, whether at rest or flowing, may be at ground potential so avoiding the difficulties arising in systems, particularly those involving continuous measurement of pH of a stream, in which the solution must be isolated from ground.

Furthermore, the heating of cathode 85 by current from a regulated source and the conductive connection between cathode 85 and the control grid stabilizes or fixes the operating point of the tube 13.

Although the system as thus far described may be operated from an "A" battery and a "B" battery, for example a 3 volt "A" battery and a 45 volt "B" battery for a tube of aforesaid 1D5GP type, it is feasible and in most cases preferable to use a well regulated power supply.

Referring to the lower half of Fig. 11, power-pack 90 may comprise a full wave rectifier 91 and one or more sections of capacity-inductance filter, choke coil 92 and condensers 93, suitable to reduce the ripple voltage to inappreciable magnitude. Beyond the filter is disposed tube 94 whose anode-cathode resistance, effectively in series with the resistances 95, 96 between the positive terminal of the filter and the B+ terminal of the power supply, is controlled by tube 97 whose anode 109 is connected to the control grid 110 of tube 94. The control grid 115 of tube 97 is connected to a point intermediate the terminals of a voltage divider comprising resistances 111, 112, and 113. The more positive terminal of resistance 95 is connected to the screen-grid 114 of tube 97 and, through resistance 116, to the anode 109 of the tube. The suppressor grid 118 and one terminal of the filament 117 are connected to the common terminal of resistances 95 and 96. The other terminal of the filament 117 is connected to the B+ terminal of the power supply through resistance 122, to the A+ terminal of the power supply through resistances 119 and 122, and to one terminal of the voltage regulator tube 120 whose other terminal is connected to the A— conductor of the power supply.

By way of example, the tubes 94, 97 and 120 may be of the 2A3, 1N5G and VR—105–30 types respectively and resistances 95, 96, 111, 112, 113, 116, 121 and 122 may be 1500, 100, 100,000, 105,000, 100,000, 500,000, 800 and 1050 ohms respectively. The transformer 123 is provided with a high voltage winding 124 for supplying the anode circuit of the rectifier 91, a low voltage winding 125 for supplying the cathode heating current of rectifier 91, and a low voltage winding 126 for supplying the cathode heating current of tube 94. The cathode heating current of amplifier tube 97 is derived from the regulated direct current output of the power-pack.

In the system shown in Figs. 13, 13A and 14, the rebalancing adjustment of slidewire 2 is effected by induction motor 127 having one of its field windings (128) continuously energized from a source of alternating current, such as a 60 cycle 110 volt power line, having fixed phase relation with respect to the current in coil 4a and another of its field windings (129) in the output circuit of tube 130 in the final stage of amplifier 10.

The alternating current in winding 129 leads or lags the current in winding 128 in dependence upon whether the unknown voltage $Ex$ is higher or lower than the standard voltage $Es$ (preferably as modified by voltage $Ea$ in compensation for changes in ambient temperature). The alternating signal voltage existent when those voltages are not equal is amplified by tubes 13, 131, 132, 133 and applied by conductor S4 to the control grid 134 of tube 130; which may for example be of the 6L6-G type.

The signal voltage at less than full gain of the amplifier 10 is impressed by conductor S3 upon the grid 135 of the braking-control tube 136, such as a 6L6-G, whose direct-current anode circuit includes the field winding 129 of motor 127. The gride of tube 136 is so biased that for small or zero signal its anode current is considerable thus providing substantial braking coefficient. For larger signals, greater unbalances of $Es$ and $Ex$, a small signal is impressed upon the input circuit of tube 136; the alternating component of the signal permitted to pass by condenser 137 is rectified, as by the diode 138, 139, which may be included in tube 136, to provide in conjunction with condenser 166 and resistor 167 a negative potential applied to the grid 135 of tube 136. Consequently, the anode-cathode resistance of the tube 136 is increased, correspondingly decreasing the direct-current flowing through the field-winding 129 and therefore the braking effect of the anode current of tube 136.

For still larger unbalances of $Ex$ and $Es$, for example more than ten percent of the range of measurement, the derived negative potential of grid 135 may become so great that the anode-current of tube 136 is cut-off and the damping coefficient therefore becomes zero.

A principal advantage of this rebalancing arrangement is that although the available motor torque is maximum for even a small fraction of a percent of the range of measurement neither inertia of the moving parts nor delay in the amplifier cause overshooting of the balance point of the slidewire because the damping coefficient increases progressively to maximum as balance is approached. The relations of torque, damping coefficient and equilibrium speed of the motor are illustrated by the self-explanatory curves T, D and E respectively of Fig. 15.

To compensate for the variations in current demand of tube 136 upon the output voltage of power-pack 90, there is preferably utilized tube 140, which may also be of 6L6-G type, having its control grid 141 connected to voltage-dividing resistance 142—142A and its cathode connected to the cathode 138 of tube 136 for inclusion in their common anode-circuit return of the biasing resistance 143. In consequence the sum of the anode currents of tubes 136 and 140 is held very nearly constant notwithstanding the wide variation in magnitude of the anode current of the former.

The anode current of the tubes 130, 136 and 140 may also be used to excite their heaters H130, H136 and H140; and the voltage drop across one or more of them may be utilized to provide the operating bias of tube 130, as by the indicated connection of the grid leak 165. The anode current and cathode-heating current of tubes 130, 136 and 140 are supplied from the power pack 90 by the conductors NB and BB.

The network 144, Fig. 13, included in the input circuit of tube 130 is effective, when motor 127 has moved the slidewire 2 to a limit of its travel in one direction, to prevent response of tube 130 to a signal of such phase the motor 127 would be excited for further movement in the same direction; under such circumstance however, network 144 permits response of the tube 130 to signals of opposite phase which, as above described, cause rotation of motor 127 in the reverse direction.

The connection from the output of the tube 133 to the grid 134 of tube 130 includes a high impedance 145, such as a high resistance, connected to the anode and cathode respectively of the diodes 146, 147, or equivalent. Each of these rectifiers is included in a path, between the points Y and Z, in shunt to the input connections to tube 130; one path includes diode 147 and resistance 147L, the other includes diode 146 and resistance 146L.

The anode of diode 147 is connected to the anodes of rectifiers 149, 150 and the cathode of diode 146 is connected to the cathodes of rectifiers 151, 152; rectifiers 149—152 may be, for example, the copper/copper oxide type. A source of alternating current, for example the tapped secondary winding 153A, 153B of transformer 123 is included in that arm of the rectifier bridge 149—152 conjugate to the arm including the rectifiers 146, 147.

With the limit switches 148H, 148L both closed all four rectifiers of the bridge 149—152 pass current and therefore the anode of diode 147 is maintained negative with respect to its cathode and the cathode of diode 146 is maintained positive with respect to its anode. Under this circumstance, neither of the rectifiers 146, 147 bypasses signal current and the tube 130 is responsive to either phase of signal voltage to cause operation of motor 127 in either direction.

Assuming however switch 148H has been opened by movement of slidewire 2 to the "high" limit of its travel, tube 147 is conductive for one-half of each cycle of the voltage of winding 153B and the tube 146 is conductive for the other half-wave of each cycle. A signal tending to cause rotation of the motor 127 in the same direction as before is of such phase relation to the voltage of winding 153B that the tubes 146, 147 provide a low impedance path in shunt to the input of tube 130 and practically all of the signal is dissipated in the high impedance 145. In effect the "raise" signal voltage tending to effect undesired operation of motor 127 is blocked insofar as tube 130 is concerned.

A "lower" signal voltage tending to cause reverse rotation of motor 127 is substantially 180° out of phase with respect to a "raise" signal voltage; consequently, the anode of tube 147 is positive only for negative half waves of the "lower" signal voltage and no signal current is by-passed by tube 147; the cathode of tube 146 is negative only for positive waves of the "lower" signal voltage and no signal is by-passed by tube 147.

In short, with switch 148H open, the shunting or by-passing network 144 is of low impedance to a signal of the "raise" phase but of high impedance to a signal of the "lower" phase.

Similarly, with switch 147L open, the signal-shunting network 144 is of low impedance to a signal of the "lower" phase but of high impedance to a signal of the "raise" phase.

With both switches closed, the network 144 is of high impedance to signals of either phase and tube 130 is free to effect operation of motor in either direction in dependence upon the phase of the signal voltage.

When it is desired to record a plurality of quantities for example temperatures, a multi-position switch 155 is used to connect the thermocouples in turn to the vibrator circuit. For example, when there are only two thermocouples, the switch 155 may be a two-pole double-throw switch operated by cam 156 driven at suitable speed from shaft 157, driven by motor M, of the mechanism which drives the recorder chart 158 at constant speed. For a larger number of thermocouples, the pen 159 may be replaced by a print-wheel and switch 155 replaced by a selector switch having a correspondingly larger number of circuit-controlling positions, all such as shown for example in Letters Patent 2,113,069 to Ross et al.

Concurrently with operation of switch 155 to include a particular thermocouple in circuit, switch 160 is operated also to include in circuit the corresponding cold-junction compensating network; for example, in Fig. 13 when switch 155 is thrown upwardly for measurement of the voltage of thermocouple 1, the switch 160 is thrown to the left for inclusion in the thermocouple circuit of the compensating network comprising resistors 161, 162 the latter having a substantial temperature coefficient of resistance so that the voltage drop across it effectively in series with $E_x$ and $E_s$ varies with ambient temperature.

Similarly when switch 155 is thrown to substitute thermocouple 1A for thermocouple 1 in the measuring circuit, the switch 160 is operated to substitute for resistors 161, 162 the compensating network comprising resistors 161A, 162A. For a larger number of thermocouples, the number of compensating networks are correspondingly increased. Switch 160 of Fig. 13 may be operated by cam 163, Fig. 14, or it may be of the multi-point type shown in aforesaid Ross et al. patent.

The resistances 161, 161A are of relatively high and constant magnitude to minimize effect upon the current through the branch including slidewire 2 of the changes in magnitude of resistances 162 and 162A and of the substitution of 161, 161A for 162, 162A in shunt to that branch.

With but slight change, the system of Fig. 11 or 13 is suited for repeated successive measurement of the voltages of a plurality of ion-concentration cells. For the cold junction compensation networks of Fig. 13 are substituted the networks A1—A3 each including a slidewire, corresponding with slidewire 73 of Fig. 11, manually adjustable to correct for the asymmetry potential of the corresponding ion-concentration cell, and a temperature compensating resistance 164 having substantial temperature coefficient of resistance automatically to ensure proper asymmetry correction despite changes in temperature.

Because the slidewire 2 and networks A1—An are supplied from a common well-regulated source of current, the switching from one to another of networks A1—An does not prevent immediate and correct measurement of the voltages produced by the corresponding ion-concentration cells connected to the pairs of leads 15A, 15A; 15B, 15B; 15C, 15C.

What I claim is:

1. A measuring system comprising an ion-concentration cell containing an aqueous solution at ground potential, a source of constant unidirectional voltage, an asymmetry-correction potentiometer including a slidewire traversed by current from said source, a pH measuring potentiometer including a slidewire traversed by current from said source to provide a known unidirectional voltage variable in accord with variations of the voltage of said cell, an amplifier system including an electronic tube, a switch having movable contact structure capacitively coupled to the control electrode of said tube movable to one position to make a circuit including said cell and one of said potentiometers in the input system of the amplifier and to another position to break said circuit and to include, with like polarity, the other of said potentiometers in said input system so to produce an alternating signal voltage, and means in the output system of said amplifier for effecting adjustment of said measuring potentiometer in sense determined by the phase of said alternating signal voltage with respect to the movement of said contact structure.

2. A measuring system comprising a source of constant unidirectional voltage, a plurality of compensating networks in succession connected to said source of constant voltage for producing independently variable compensating voltages, a plurality of sources of unknown unidirectional voltages to be measured in succession, a condenser, means for periodically impressing upon said condenser voltages of magnitudes corresponding respectively with similarly poled unidirectional unknown and compensating voltages, a potentiometer network including a slidewire traversed by current from said constant voltage source of magnitude unaffected by substitution of one for another of said compensating networks, said slide wire providing a known unidirectional voltage variable in accord with each of said unknown unidirectional voltages, an amplifier, a switch having contact structure movable to different positions to impress upon the input system of said amplifier an alternating signal voltage of phase determined by the polarity of the resultant of a selected one of said unknown voltages, the corresponding compensating voltage and the effective slidewire voltage, and means in the output system of said amplifier for effecting adjustment of said slidewire in sense determined by the phase of aforesaid signal voltage with respect to the movement of said contact structure.

3. A measuring system comprising a source of constant unidirectional voltage conductively isolated from earth, a source of unknown unidirectional voltage between which and earth may exist a unidirectional or alternating difference of potential, a connection from similarly poled terminals of said sources to earth including a condenser of substantial capacitance to block passage of direct current and to offer low impedance to alternating currents, an amplifier including an electronic tube, a switch including a contact capacitively coupled to the control electrode of said tube and movable to engage relatively fixed contacts conductively connected to the other similarly poled terminals of said sources respectively, means for indicating magnitudes of said unknown unidirectional voltage, and means in the output system of said amplifier for controlling said indicator and movable in direction determined by the sense of change of potential of said movable contact upon engagement with one of said fixed contacts and without effect by aforesaid difference of potential.

4. A measuring system comprising an ion-concentration cell, a source of constant unidirectional voltage, an amplifier system including an electronic tube whose cathode is heated from said source, a resistance connected between said cathode and the control electrode of said tube, a potentiometer network including a slidewire traversed by current from said source, the difference of potential between the terminals of the adjusted portion of said slidewire constituting a source of known unidirectional voltage, a switch having movable contact structure capacitively coupled to aforesaid control electrode and operated alternately to include said cell and said source of known voltage, similarly poled, in circuit with the cathode and control electrode, means for indicating magnitudes of said unknown voltage, and means in the output system of said amplifier for controlling said indicating means and effecting adjustment of said slidewire in response to an alternating signal voltage resulting from operation of said contact structure.

5. A recorder system comprising a source of unknown unidirectional voltage, an adjustable impedance traversed by current from a source of unidirectional voltage, the difference of potential between the terminals of the adjusted portion of said impedance constituting a source of known unidirectional voltage, an amplifier, a condenser connected in the input circuit thereof, a contact movable alternately to make connections in succession of said unknown and known unidirectional voltages, similarly poled, with said condenser in the input system of said amplifier, a deflecting galvanometer in the output system of said amplifier, a recorder element, means controlled by said galvanometer effecting adjustments of said recorder element and of the magnitude of said known unidirectional voltage, means periodically imparting to said contact movements whose phase is fixed and independent of said voltages, and means for preventing actuation of said recorder element in response to one only of the known and unknown voltages comprising means operating in synchronism with completion of one of said connections to prevent deflection of said galvanometer.

6. A system for measuring the varying voltage of a thermocouple comprising a source of constant unidirectional voltage, a potentiometer including an adjustable impedance traversed by current from said source, the difference in potential between the terminals of the adjusted portion of said impedance constituting a source of known unidirectional voltage, a cold-junction compensating network traversed by current from said first named source, an amplifier comprising at least one tube whose voltage and current requirements are provided by said first named source, a condenser connected in the input system of said amplifier, a contact member in the input system of said amplifier, contacts engaged at different times by said contact member for impressing said known and thermocouple voltages upon said condenser, said thermocouple and its said compensating network included in said input system through one of said contacts while engaged by said contact member, said second named source of voltage, poled similarly to said thermocouple, included in said input system through another of said contacts while engaged by said contact member, means for indicating magnitudes representative of voltage of said thermocouple, and means in the output system of said amplifier controlling said indicating means and adjusting said impedance in sense determined by the sense of change of the potential of said contact member upon movement thereof into engagement with one of said contacts.

ALBERT J. WILLIAMS, Jr.